(No Model.)
G. BLAKISTONE.
WHEEL FENDER FOR CARS.
No. 513,702. Patented Jan. 30, 1894.
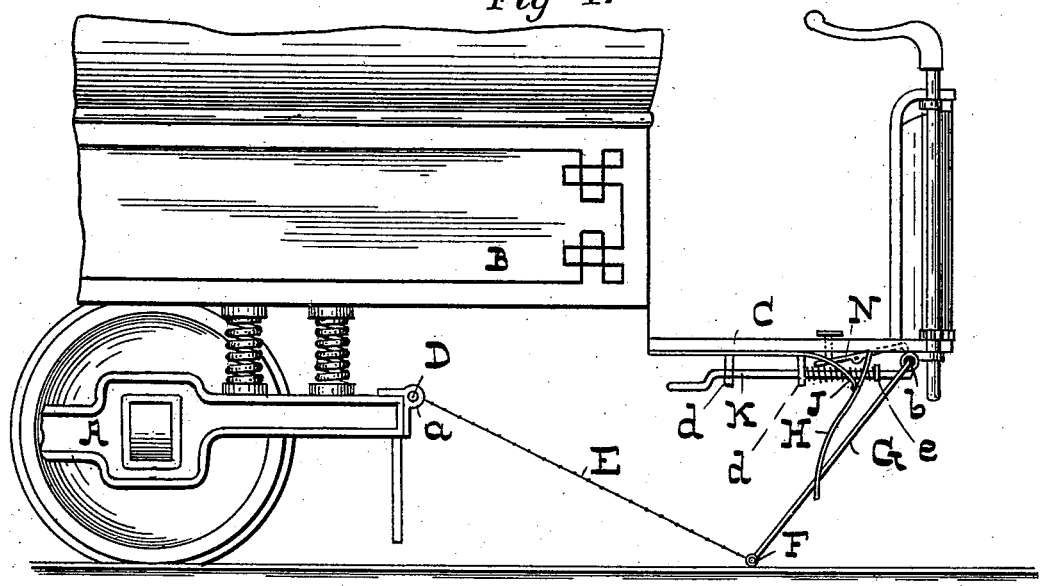
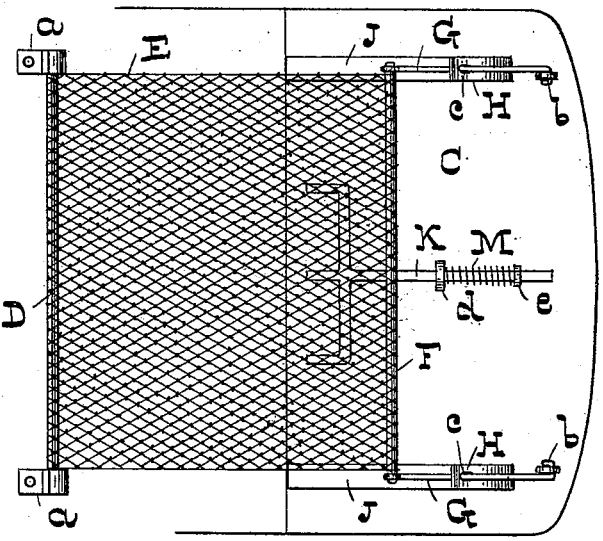
WITNESSES
Dan'l Fisher
George Hemsley
INVENTOR
Geog Blakistone,
by W. H. J. Howard,
Atty.
THE NATIONAL LITHOGRAPHING COMPANY,
WASHINGTON, D. C.

UNITED STATES PATENT OFFICE.

GEORG BLAKISTONE, OF BALTIMORE, MARYLAND.

WHEEL-FENDER FOR CARS.

SPECIFICATION forming part of Letters Patent No. 513,702, dated January 30, 1894.

Application filed July 18, 1893. Serial No. 480,796. (No model.)

*To all whom it may concern:*

Be it known that I, GEORG BLAKISTONE, of the city of Baltimore and State of Maryland, have invented certain Improvements in Wheel Fenders or Guards for Cars, of which the following is a specification.

This invention relates to certain improvements in the wheel fender or guard described in my application Serial No. 479,106, dated June 29, 1893, to which reference should be had. In the said application I describe a wheel guard which, briefly stated, consists in a sheet of flexible material, attached at one end to the car, and at the other end provided with a bar which is drawn along the rails of the track, when the invention is in use, by means of two cords or chains. I find that the bar at the lower end of the flexible sheet and which is drawn along the track rails, has not sufficient tendency to remain in contact with the rails by weight alone and is liable to rise and pass over an object on the track. The weight of the said bar requires the assistance of springs to effect the desired result, and I now therefore, in the present invention, substitute rods for the cords or chains, and apply to the rods suitable springs which serve to keep the bar closely in contact with the rails, but with a yielding pressure. I also arrange the springs so that their tension is increased as the bar reaches the rails, without placing an unnecessary strain on the devices which hold the bar and the loose flexible sheet to the under side of the platform, as will hereinafter fully appear.

In the further description of the said invention which follows, reference is made to the accompanying drawings forming a part hereof and in which—

Figure 1 is a side elevation of the front end of a car provided with the present invention. Fig. 2 is a central section of Fig. 1 except that the apron is held out of contact with the rails, the fender not being in a position for use. Fig. 3 is an under side view of Fig. 1, without the truck of the car.

Referring now to the drawings, A is the front truck, B the body and C the front platform of the car.

D is a bar attached in any suitable manner to the truck A. The means for securing the said bar to the truck is shown as consisting of two brackets a bolted to the truck.

E is an apron of some flexible material, preferably cord netting or duck, attached to the bar D with a second bar F at its lower end or edge.

G G are rods hinged at b to the under side of the platform and connected in any appropriate manner to the bar F.

H H are springs pendent from the car platform with their lower ends bearing against the rods G. The ends of these springs may be forked where they come in contact with the rods G, or they may have holes c through which the said rods pass, as shown in the drawings.

J J are reinforcing springs to strengthen the ones H. These reinforcing springs are adapted to be folded under the ones H, when the latter are secured to the under side of the car platform, and when folded they exert little force on the springs H. See Fig. 2.

K is a forked bar or bolt whereby the bar F may be held in its elevated position. It is arranged to slide in bearings d. A spring M coiled about the bolt K and confined endwise between a collar e and one of the bearings d, serves to keep the said bolt yieldingly in a position wherein its prongs will not engage with the bar F when it is lifted to its highest position under the car platform.

N is a spring latch having a treadle above the floor of the car platform. The end of the latch N is adapted to engage with the end of the bolt K and keep the fork tines or prongs of the forked bolt directly under the bar F and thereby support the same, as shown in Fig. 2, which illustrates the position in which the fender is held until there is danger of the car colliding with a person or object on the track. Should a person fall on the track in front of the car, and there is not sufficient time to stop the car and prevent an accident, the motor or grip man places his foot on the treadle which releases the bolt and allows the springs H and J to force the bar F onto the track rails.

I do not limit myself to the arrangement of the springs to hold the bar F to the rails which I have described, as effective springs may be arranged in other ways too numerous to mention. Neither do I limit myself to any particular construction of the releasing bolt or the latch, as other devices can be used which will effect the result desired equally as well as the ones shown and described.

I claim as my invention—

1. A wheel fender or guard for a car which consists essentially of an apron of flexible material attached at its inner end to the car body or truck, and at the outer end provided with a bar, combined with supporting rods, attached to the front end of the platform and springs to yieldingly keep the said bar in its lowest position or in contact with the track rails, substantially as specified.

2. A wheel fender or guard for a car which consists of an apron of flexible material with a bar at its lower edge, combined with spring held bars which serve to yieldingly hold the said bar in a position in contact or nearly in contact with the track rails, and a detaching bolt mechanism whereby the said bar may be held in an elevated position and dropped, substantially as specified.

3. A wheel fender or guard for a car which consists of an apron of flexible material, attached at its inner or rear end to the car body or truck, and at the outer or forward end provided with a rod or bar which is drawn along the track rails, combined with springs which serve to press said bar on the rails, with a force, dependent only upon the strength of the springs, substantially as specified.

4. A wheel fender or guard for a car located wholly under and backward of the front edge of the platform, consisting of an apron of flexible material attached at its inner or rear end to a suitable part of the car and provided at its outer or forward end with a cross bar, combined with solid supporting and propelling rods attached to the cross bar at one end, and arranged to project forwardly therefrom, and attached at the other end to the platform of the car and thereby draw the fender along the track as distinguished from pushing it, substantially as specified.

GEORG BLAKISTONE.

Witnesses:
H. M. VICKERS,
DANL. FISHER.